(12) United States Patent
Alberth, Jr. et al.

(10) Patent No.: US 8,564,619 B2
(45) Date of Patent: Oct. 22, 2013

(54) ELECTRONIC DEVICE AND METHOD FOR DISPLAYING A BACKGROUND SETTING TOGETHER WITH ICONS AND/OR APPLICATION WINDOWS ON A DISPLAY SCREEN THEREOF

(75) Inventors: William P. Alberth, Jr., Prairie Grove, IL (US); Daniel J. Declerck, Lake Barrington, IL (US); Dean E. Thorson, Grayslake, IL (US); William S. Hede, Lake in the Hills, IL (US)

(73) Assignee: Motorola Mobility LLC, Libertyville, IL (US)

( * ) Notice: Subject to any disclaimer, the term of this patent is extended or adjusted under 35 U.S.C. 154(b) by 976 days.

(21) Appl. No.: 12/641,028

(22) Filed: Dec. 17, 2009

(65) Prior Publication Data

US 2011/0148917 A1 Jun. 23, 2011

(51) Int. Cl.
*G09G 5/00* (2006.01)
(52) U.S. Cl.
USPC .......... 345/629; 715/730; 715/763; 715/779; 715/867
(58) Field of Classification Search
USPC ................... 345/629; 715/730, 763, 779, 867
See application file for complete search history.

(56) References Cited

U.S. PATENT DOCUMENTS

| | | | |
|---|---|---|---|
| 7,278,093 B2 | 10/2007 | Jablonski et al. | |
| 7,312,798 B2 | 12/2007 | Yach et al. | |
| 2005/0071771 A1 | 3/2005 | Nagasawa et al. | |
| 2006/0164436 A1 | 7/2006 | Yach et al. | |
| 2007/0115373 A1 | 5/2007 | Gallagher et al. | |
| 2008/0278438 A1 | 11/2008 | Brown et al. | |
| 2008/0282177 A1 | 11/2008 | Brown et al. | |

FOREIGN PATENT DOCUMENTS

EP 0 514 307 A2 11/1992

OTHER PUBLICATIONS

Apple Inc.,—iPhoto '09—Organize, edit, and share photos on the web or in a book; http://www.apple.com/ilife/iphoto/, 2009 (4 pages).
David G. Lowe; *Distinctive Image Features from Scale-Invariant Keypoints International*; Journal of computer Vision 60(2), pp. 91-110, Kluwer Academic Publishers, 2004, The Netherlands (1 page containing Abstract).

*Primary Examiner* — Maurice L McDowell, Jr.

(57) ABSTRACT

An electronic device is operable to display images on a display screen of the device's display. The images include at least one icon and at least one image to be used as a background setting for the display screen. The electronic device includes the display, at least one storage device, and a processing unit. The storage device(s) digitally stores the images and operating instructions for displaying the images. The processing device is operable in accordance with the operating instructions to: retrieve the images from the storage device, determine at least one portion of the background setting that is of higher importance than a remainder of the background setting to produce at least one high importance portion of the background setting, and instruct the display to display the background setting and the icons on the display screen such that the high importance portion(s) of the background setting is viewable.

20 Claims, 7 Drawing Sheets

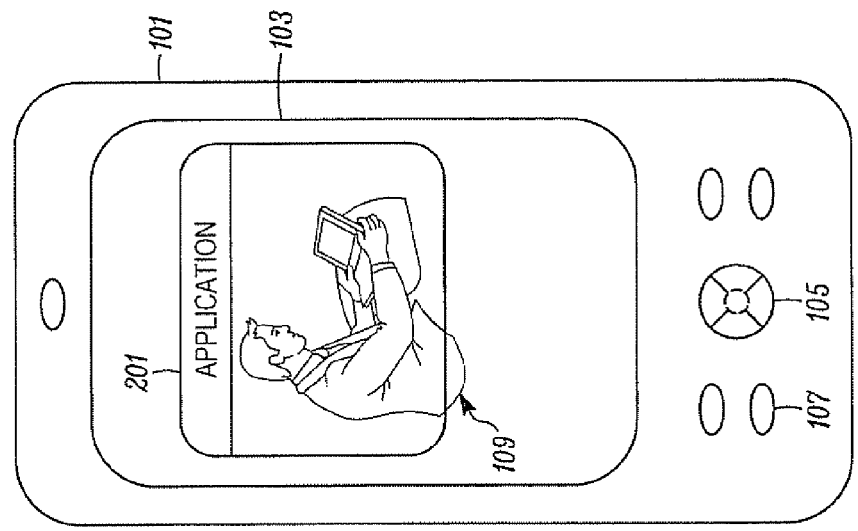
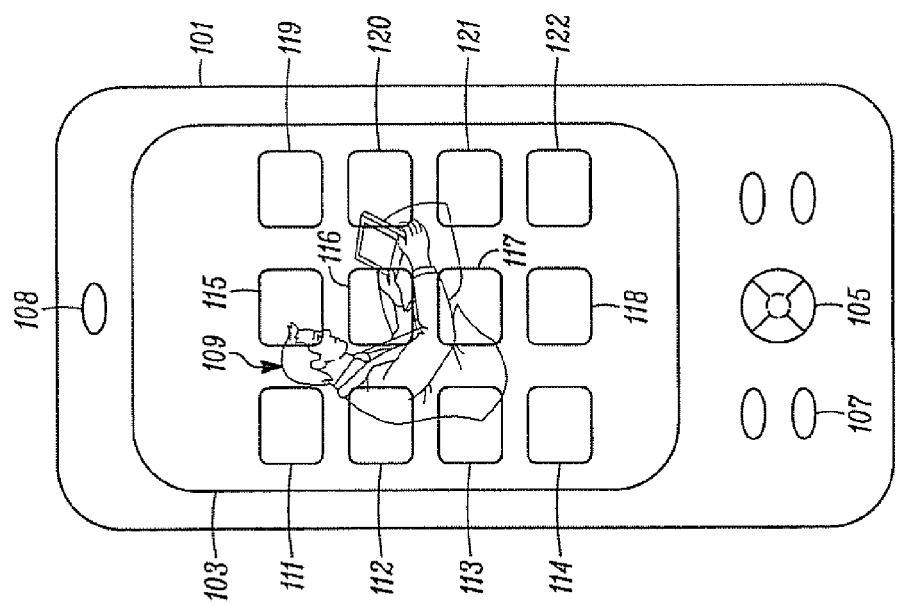

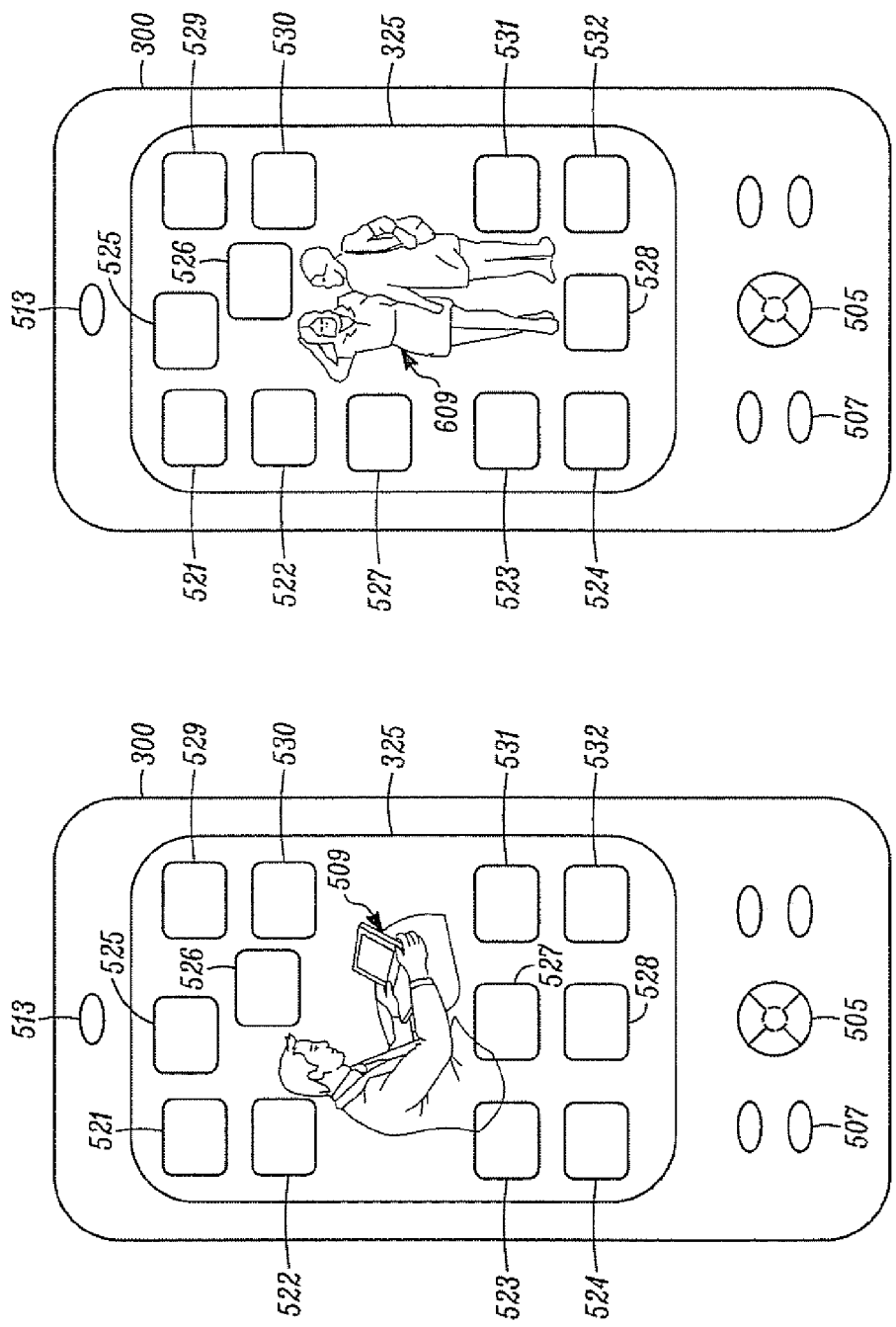

ELECTRONIC DEVICE AND METHOD FOR DISPLAYING A BACKGROUND SETTING TOGETHER WITH ICONS AND/OR APPLICATION WINDOWS ON A DISPLAY SCREEN THEREOF

FIELD OF THE INVENTION

The present invention relates generally to electronic devices and, more particularly, to displaying a background setting (e.g., electronic wallpaper) together with icons or application windows on an electronic device's display screen so as to maintain viewability of high importance portions of the background setting.

BACKGROUND

The display of icons and background settings, such as wallpaper, on display screens of electronic devices is well known. On large display screens, such as those used for personal computers, the display of desktop icons can usually be manipulated by the user (e.g., using drag and drop techniques) such that the icons and the wallpaper can be readily viewed together. However, in some cases, the quantity of icons used to indicate shortcuts to programs, electronic folders, software applications, files, and so forth may be such that the icons can impede viewing of the more important aspects of the background setting.

The likelihood of icons impeding view of a display screen's background is even greater on small display screens, such as those used in wireless devices. An exemplary wireless device 101 illustrating, this point is shown in FIG. 1. As shown, the wireless device 101 includes a display screen 103, a user interface (which may include a two-dimensional rocker key 105, buttons 107, keys, a scroll wheel, and/or other conventional user interface devices), and an optional camera 108. The display screen 103 displays a background setting 109 (in this example, a man typing at a computer) and multiple icons 111-122 (twelve shown). As is known in the art, the icons 111-122 may represent applications loaded onto the wireless device 101, functions of the wireless device 101, shortcuts to applications, files, data, or various other information. As can be readily discerned from FIG. 1, the icons 111-122 substantially cover the background setting 109 and impede viewability of the background setting 109, especially the more important areas of the background setting 109, such as, in this case, the man's face or head.

Viewability of an electronic device's background setting may also be impeded by windows opened on the display screen during execution of one or more applications. Such a scenario is depicted in exemplary form in FIG. 2 for the wireless device 101 of FIG. 1. As shown in FIG. 2, an application window 201 is displayed on top of the background setting, 109 of the wireless device 101. In FIG. 2, the application window 201 is clear, enabling the background setting 109 to be viewed for the most part. However, if the application window 201 was colored (as is often the case), viewability of the background setting 109 would be severely impeded due to the overlay of the application window 201 upon the background setting 109.

BRIEF DESCRIPTION OF THE DRAWINGS

The accompanying figures, where like reference numerals refer to identical or functionally similar elements throughout the separate views and which together with the detailed description below are incorporated in and faun part of the disclosure, serve to further illustrate various embodiments and to explain various principles and advantages all in accordance with the present invention.

FIG. 1 illustrates an exemplary, prior art arrangement of icons and a background setting on a display of an electronic device.

FIG. 2 illustrates an exemplary, prior art arrangement of an application window and a background setting on the display of the electronic device of FIG. 1.

FIG. 5 illustrates automated positioning of displayed icons on a display screen of a handheld device embodiment of the electronic device of FIG. 3 so as to maintain viewability of high importance portions of a background setting, in accordance with an exemplary embodiment of the present invention.

FIGS. 6-8 illustrate automated positioning and repositioning of displayed icons on a display screen of a handheld device embodiment of the electronic device of FIG. 3 so as to maintain viewability of high importance portions of a slideshow background setting, in accordance with another exemplary embodiment of the present invention.

Figure 3:
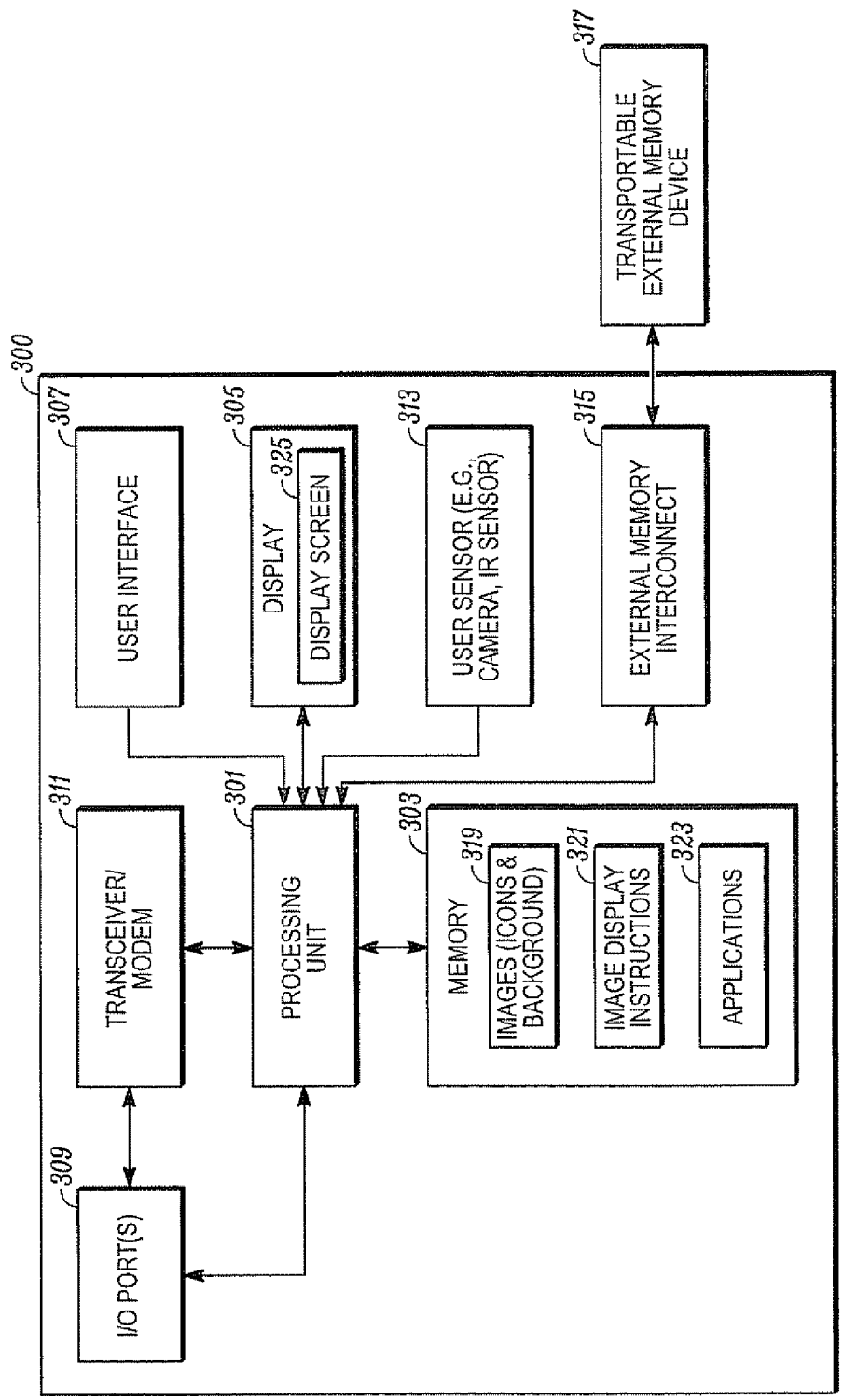
FIG. 3 is an electrical block diagram of an electronic device in accordance with an exemplary embodiment of the present invention.
Figure 4A:
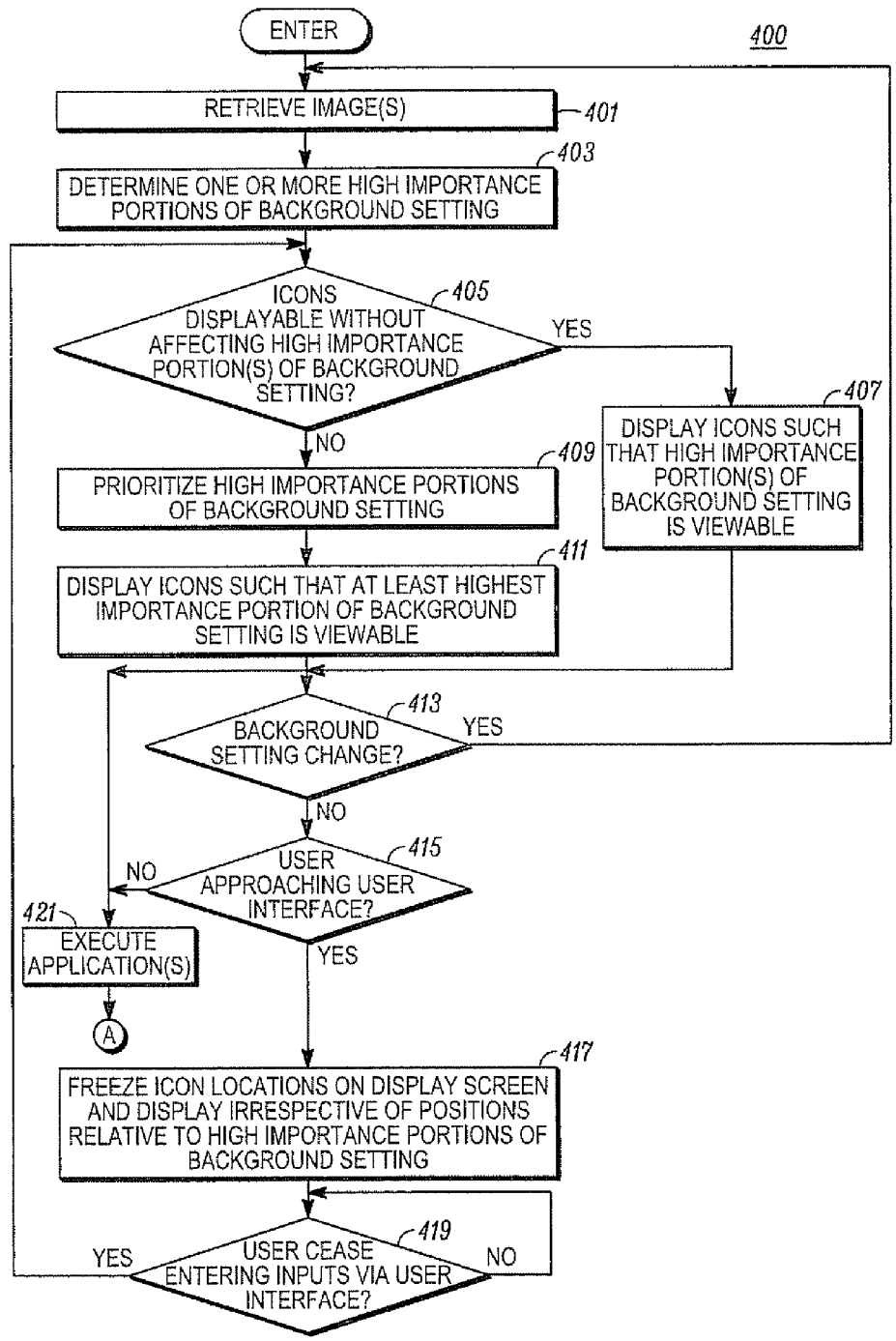
FIGS. 4A and 4B are collectively a flow diagram of steps executed by an electronic device to display a background setting and one or more icons or application windows without impeding viewability of high importance portions of the background setting, in accordance with an exemplary embodiment of the present invention.
Figure 4B:
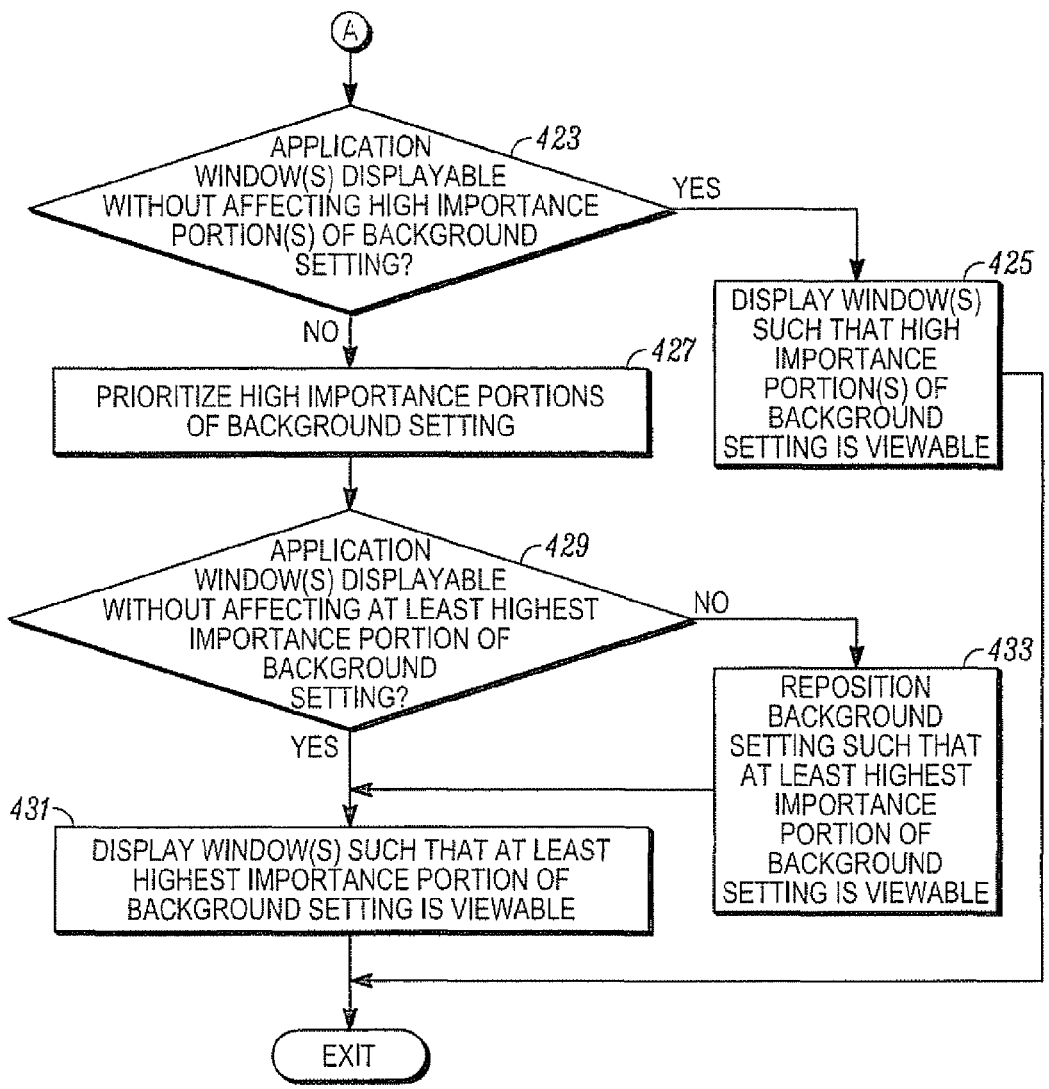

Skilled artisans will appreciate that elements in the figures are illustrated for simplicity and clarity and have not necessarily been drawn to scale. For example, the dimensions of some of the elements in the figures may be exaggerated alone or relative to other elements to help improve the understanding of the various embodiments of the present invention.

DETAILED DESCRIPTION

Generally, the present invention encompasses an electronic device and a method for displaying a background setting together with one or more icons and/or application windows on a display screen thereof. The electronic device may be a computer, a smart phone, a cellular phone, a handheld game system or any other electronic device that includes, inter alia, a display, at least one storage device, and a processing unit. The display includes a display screen on which images are electronically displayable. In one embodiment, the images include at least one icon and at least one image to be used as a background setting (e.g., electronic wallpaper) for the display screen. The storage device(s) is operable to, inter alia, digitally store the images and operating instructions for displaying the images. The storage device(s) may be at least one of an internal memory of the electronic device and a transportable external memory connectable to the electronic device.

The processing, unit, which is operably coupled to the display and the storage device(s), is operable in accordance with the stored operating instructions. In one embodiment, the processing unit is operable to retrieve the images from the storage device and determine at least one portion of the background setting that is of higher importance than a remainder of the background setting. The processing unit then instructs the display to display the background setting and the icon or icons (e.g., a plurality of icons) together on the display screen such that the high importance portion of the background setting is viewable. In an alternative embodiment, the processing, unit may be further operable to determine multiple portions of the background setting that are of higher importance than a remainder of the background setting and instruct the display to display the background setting and the icon or icons on the display screen such that all or some of the high importance portions of the background setting are viewable.

In yet another embodiment in which a plurality of icons are stored in the storage device for display on the display screen, the processor may be further operable to determine a first portion of the background setting that is of highest importance and at least a second portion of the background setting that is of lower importance than the highest importance portion of the background setting, but is of higher importance than a remainder of the background setting. The processing unit may then determine whether the icons and the background setting can be displayed together on the display screen such that at least the highest and higher importance portions of the background setting are viewable. If the icons and the background setting cannot be displayed together on the display screen such that at least the highest and higher importance portions of the background setting are viewable, the processing unit may instruct the display to display the icons and the background setting together on the display screen such that at least the highest importance portion of the background setting is viewable. In one embodiment in which the background setting includes a photograph of a person, a face of the person may be the highest importance portion of the background setting and a torso of the person may be of lower importance than the face, but of higher importance than a remaining environment depicted in the photograph. In a further embodiment in which the background setting also includes a photograph, the processing unit may be operable to determine one or more high importance portions of the background setting by comparing the photograph to at least one photograph stored in a photo directory of the storage device or comparing properties associated with the photograph to group membership information stored in the storage device.

In yet another embodiment in which the background setting includes several automatically changing images implementing a slideshow, the processing unit may be further operable to determine at least one high importance portion for each of the slideshow images and instruct the display to display, on an image-by-image basis, a particular image of the slideshow and the icon or icons together on the display screen such that the high importance portion or portions of the particular image are viewable. In a further slideshow-related embodiment, the electronic device may also include a user interface and a user sensor. The user interface, which may be implemented as buttons, rocker keys, keypads, scroll wheels, and/or by any other conventional means, or even as a touchscreen interface incorporated into the display screen itself, is operable to accept inputs from a user of the electronic device. The user sensor, which may be implemented as an infrared sensor, a camera, and/or any other conventional proximity detection means, is operable to detect whether the user is approaching the user interface. In such an embodiment, the processing unit may be further operable to instruct the display to display the slideshow images and the icon or icons together on the display screen irrespective of whether high importance portions of the slideshow images are viewable when the user sensor detects that the user is approaching the user interface (e.g., to enter inputs via the user interface). For example, the processing unit may instruct the display to permit changing of the slideshow images, but halt repositioning of the icons to allow the user to easily select one or more of the icons via the user interface. In such a case, the continued changing of the background slideshow may cause the icons to be displayed upon one or more high importance portions of the background image. Alternatively, the processing unit may halt changing of both the background slideshow and the icon positions to keep the high importance portions of the background image viewable. The processing unit may also then optionally determine whether the user has ceased entering inputs via the user interface and, if so, instruct the display to resume displaying the slideshow images and the icon or icons together on the display screen such that the high importance portions of the slideshow images are again viewable.

In yet another embodiment the background setting may include several automatically changing images implementing a video instead of a slideshow. In such a case, the processing unit may be further operable to determine at least one high importance portion for each of the video images (e.g., video frame by video frame) or for each set of video images (e.g., over a time period greater than a video frame, such as every five or ten frames). The processing unit may then instruct the display to display, on a video image-by-video image or image group-by-image group basis, a particular video image or group of video images and the icon or icons together on the display screen such that the high importance portion or portions of the currently displayed video image are viewable. As discussed above with respect to the aforementioned slideshow embodiment, the processing unit may be further operable to instruct the display to display the video images and the icon or icons together on the display screen irrespective of whether high importance portions of the video images are viewable when the user sensor detects that the user is approaching the user interface (e.g., to enter inputs via the user interface). For example, the processing unit may instruct the display to permit changing of the video images, but halt repositioning of the icons to allow the user to easily select one or more of the icons via the user interface. In such a case, the continued changing of the background video may cause the icons to be displayed upon one or more high importance portions of the background video image. Alternatively, the processing unit may halt changing of both the background video and the icon positions to keep the high importance portions of the background video image viewable. The processing unit may also then optionally determine whether the user has ceased entering inputs via the user interface and, if so, instruct the display to resume displaying, the video images and the icon or icons together on the display screen such that the high importance portions of the video images are again viewable.

In yet another embodiment in which the storage device(s) stores applications executable by the processing unit, the processing unit may be further operable to instruct the display to display, on the display screen, windows opened pursuant to execution of one or more of the applications such that the high importance portion or portions of the background setting are viewable. Alternatively, the processing unit may be operable to instruct the display to display, on the display screen, at least one window opened pursuant to execution of one or more of the applications and further instruct the display to reposition the background setting on the display screen such that the high importance portion or portions of the background setting are viewable during display of the application window.

By providing an electronic device with the aforementioned functionality, the present invention enables the more important portions of a background setting, such as faces in a family photo or a prominent landmark in a vacation photo, to remain viewable on a display screen notwithstanding the simultaneous display of icons and/or application windows. Thus, the present invention provides intelligent display management functionality for use with varying types of electronic devices, especially those with smaller display screens (e.g., smart phones, cellular phones, handheld game systems, netbook computers, and palmtop computers).

Embodiments of the present invention can be more readily understood with reference to FIGS. 3-10, in which like reference numerals designate like items. FIG. 3 is an electrical block diagram of an electronic device 300 in accordance with an exemplary embodiment of the present invention. The exemplary electronic device 300 includes, inter alia, a processing unit 301, at least one storage device (e.g., memory 303), and a display 305, which includes a display screen 325. As illustrated, the processing unit 301 is operably coupled to the memory 303 and the display 305. The electronic device 300 may optionally include various other elements, such as a user interface 307, input/output ports 309 (which may be wired or wireless interfaces), one or more transceivers/modems 311 (one shown) to provide wired and/or wireless communication functionality, a user sensor 313 to detect the proximity of a user to the electronic device 301, and an external memory interconnect 315 to interface with a separate, transportable external memory device 317. When included, all such components 307-315 are operably coupled to and controlled directly or indirectly by the processing unit 301. When a transportable memory device 317 is used, such a memory device 317 may serve as a supplemental storage device for the electronic device 300.

In one embodiment, the electronic device memory 303 stores a plurality of images 319, image display instructions 321 in the form of a computer program, and one or more software applications 323 (which may have their own additional display instructions for displaying windows and other items on the display 305). The stored images 309 include one or more icons (e.g., a plurality of icons) and at least one image used as a background setting for the display screen 325, such as electronic wallpaper. The image display instructions 321, when executed by the processing unit 301, instruct the processing unit 301 with respect to displaying the background setting together with the icons and/or application windows in accordance with the present invention.

The electronic device 300 may be any device capable of electronically displaying images on a display screen 325 under the control of a processing unit 301. Accordingly, the electronic device 300 may be a smart phone, a cellular phone, a netbook computer, a notebook or laptop computer, a handheld or portable gaming device, a palmtop computer, a portable DVD player, or any other display-based device. An exemplary handheld smart phone embodiment of the electronic device 300 is illustrated in FIGS. 5-10 and will be discussed in more detail below.

The processing unit 301 may be a microprocessor, a microcontroller, a digital signal processor (DSP), a state machine, logic circuitry, or any other device or combination of devices that processes information based on operational or programming instructions stored in the memory 303. One of ordinary skill in the art will appreciate that the processing unit 301 can be implemented using multiple processors as may be required to handle the processing requirements of the present invention and the various other included functions of the electronic device 300. One of ordinary skill in the art will further recognize that when the processing unit 301 has one or more of its functions performed by a state machine or logic circuitry, the memory containing the corresponding operational instructions can be embedded within the state machine or logic circuitry as opposed to being external to the processing unit 301, as is the internal memory 303 illustrated in FIG. 3. In one embodiment, the processing unit 301 controls substantially all the functionality of the electronic device 300.

In one embodiment, the electronic device's internal memory 303 stores, inter alia, the images 319, the image display instructions 321, and one or more applications 323 executed by the processing unit 301 during operation of the electronic device 300. The memory 303, which may be separate from the processing unit 301 as depicted in FIG. 3 or integrated into the processing unit 301 as noted above, can include random access memory (RAM), read-only memory (ROM), flash memory, electrically erasable programmable read-only memory (EEPROM), and/or various other forms of memory as are well known in the art. It will be appreciated by one of ordinary skill in the art that the various memory components can each be a group of separately located memory areas in the overall or aggregate device memory and that the device memory may include one or more individual memory elements. The internal memory 303 may be further supplemented by the transportable external memory device 317. The external memory device 317 may be a Universal Serial Bus (USB) flash drive, a flash memory card, a digital versatile disk (DVD), a compact disc, read-only memory (CD-ROM), a hard drive, a subscriber identification module (SIM) card, or any other portable storage device. The external memory 317 may store photographs, applications 323, or other information usable by the processing unit 301 during operation of the electronic device 300 and/or in support of the present invention.

The display 305 may be any conventional or future-developed display, such as a liquid crystal display (LCD), a plasma display, a light emitting diode (LED) display, an organic LED (OLED) display, or any other display technology, which includes a display screen 325 on which images are electronically displayable. The display 305 includes appropriate conventional drivers and may optionally include graphics processors for illuminating various portions (e.g., pixels) of the display screen 325 as instructed by the processing unit 301. The display screen 325 preferably comprises a digital display screen integrated into the display 305. In one embodiment in which the electronic device 300 includes a user interface 307, the user interface 307 may be integrated wholly or partially into the display screen 325 in the form of a touchscreen display screen, as is known in the art.

When included, the user interface 307 may be any conventional user interface or combination of conventional user interface components, such as rocker keys, buttons, a keypad, a keyboard, a scroll wheel, a thumbwheel, one or more microphones and associated speech conversion/processing software, one or more speakers, a touchpad, a touchscreen incorporated into the display screen 325 as discussed above, or any other now known or future-developed user interface technology. In the exemplary electronic devices 300 illustrated in FIGS. 5-10, the user interface 307 includes a two-dimensional rocker key 505 and a set of buttons 507.

The transceiver/modem 311, when included, may comprise any conventional hardware and software for communicating information between the electronic device 300 and one or more other devices. Thus, the transceiver/modem 311 may support one or more wired or wireless communication protocols, such as Ethernet. Wi-Fi (e.g., IEEE 802.11 a/b/g/n), WiMax (e.g., IEEE 802.16), Ultra Wide-Band (e.g., IEEE 802.15.4a draft standard), Bluetooth, Zigbee, USB, code division multiple access (CDMA), wideband CDMA, time division multiple access (TDMA). Global System for Mobile Communications (GSM). Enhanced Data GSM Environment (EDGE). General Packet Radio Service (GPRS), frequency division multiple access (FDMA), orthogonal frequency division multiplexing (OFDM), Long Term Evolution (LTE) developed by the Third Generation Partnership (3GPP), spread spectrum, or any other known or future developed access or link protocol or methodology. The transceiver/modem 311 may include multiple transceivers/modems when multiple link technologies are employed by the electronic device 300.

The I/O port 309 or ports interface the transceiver/modem 311 and/or the processing unit 301 with the outside world and may include Ethernet connectors, antennas, USB connectors, and various other connectors and physical interfaces. The external memory interconnect 315 may be one of the I/O ports 309, such as a USB port, when the external memory device 317 is used and is USB-compatible. Alternatively, the external memory interconnect 315 may be a unique interconnect, such as is conventionally used to interface with a SIM card, a flash memory card, a memory stick, or other external memory device 317.

When included, the user sensor 313 detects a proximity of the electronic device's user to the electronic device 300 and, more preferably, to the user interface 307. Accordingly, the user sensor 313 may include a camera, an infrared (IR) sensor, one or more touch sensors (e.g., capacitive touch sensors as may form part of a touchscreen incorporated into the display screen 325 and forming all or part of the user interface 307), a heat sensor, a biometric scanner, or any other mechanism used to sense the presence of an individual relative to an object. In the exemplary electronic devices 300 illustrated in FIGS. 5-10, the user sensor 313 is implemented as a camera 513 embedded into the electronic device 300.

The image display instructions 321 stored in the memory 112 include the commands for instructing the processing unit 301 with respect to displaying the stored images 309 in accordance with the present invention. Thus, the image display instructions 321 are embodied in a computer program that is stored in the memory 303 and executable by the processing unit 301.

Operation of the electronic device 300 to display stored images 309 and windows created in real-time by one or more applications 323 may be best understood with reference to FIGS. 3-10. FIGS. 4A and 4B collectively illustrate a flow diagram 400 of steps executed by the processing unit 301 to display a background setting and one or more icons or application windows without impeding viewability of high importance portions of the background setting, in accordance with an exemplary embodiment of the present invention. FIGS. 5-10 provide illustrative examples of the processing unit's automated positioning and repositioning of icons, windows, and background setting on the display screen 325 of the electronic device 300 in order to maintain viewability of the high importance portions of the background setting. With respect to the exemplary embodiments described below, display of the images 319 and application windows on the display screen 325 is controlled by the processing unit 301 in accordance with the stored image display instructions 321.

Initially (e.g., during a startup or boot-up process of the electronic device 300), the processing unit 301 retrieves (401) the images 319 stored in the internal memory 303 or the external memory 317, as applicable. The images 319 include an image used as a background setting 509, 609, 709, 809 for the display screen 325 (e.g., electronic wallpaper) and one or more icons 521-532. For purposes of describing operation of the electronic device 300 in accordance an exemplary embodiment, twelve icons 521-532 are shown at various locations on the display screen 325 in FIGS. 5-8. However, those of ordinary skill in the art will readily recognize and appreciate that more or fewer icons may be utilized and displayed, as may be desired by a user of the electronic device 300. Those of ordinary skill in the art will also readily recognize that the background settings 509, 609, 709, 809 illustrated in FIGS. 5-10 are merely examples and may be replaced by any desired background setting.

In addition to retrieving the images 319 from the memory 303, the processing unit 301 determines (403) one or more high importance portions of the background setting. The determination of the high importance portion or portions of the background setting may be performed automatically using, commercially available software or otherwise known processes for recognizing faces, objects, locations, or other features in photographs, artwork, drawings, or other images. Such feature recognition processes may be further used to compare faces or objects in a photograph used as a background setting to one or more digital photographs stored in a photo directory or contact list of the internal memory 303 or the external memory 319 or at a particular remote location, such as at a remote Internet server (e.g., website). The feature recognition processes may also compare identifications of displayed persons (e.g., as determined by facial or other feature recognition) against caller identifications of recent calls, text or email messages (e.g., short message service (SMS) messages), or other communications made from or to the electronic device 300. If the photo or photos being analyzed are located at a remote server, the processing unit 301 may communicate with the remote server via the transceiver/modem 311 in accordance with known (e.g., Internet Protocol) communication techniques.

If a feature recognition match occurs as a result of comparing the recognized feature with features in one or more of the stored images (e.g., a face in the background setting matches a face in one of the locally stored photographs or on a website), then the processing unit 301 determines that the matched feature is a high importance portion of the background setting. Feature recognition may be further used in conjunction with other programs to determine the high importance portion or portions of the background setting. For instance, mapping programs and Internet searching applications may be used to determine whether an object or location contained in a photo used as the background setting is a generally recognized place of interest or includes other generally recognized content (e.g., the Great Sphinx, the Eifel Tower, Mount Rushmore, a famous celebrity or athlete, and so forth). Alternatively, the user interface 307 may allow the user to select portions of a stored or displayed image as being of high or higher importance (e.g., through use of photo tagging).

Depending upon the selected background setting, the processing unit 301 may determine multiple high importance portions of the background setting. Such high importance portions may include faces, entire bodies, objects, animals, and so forth. For example, referring to FIG. 5 (which depicts display of a background setting 509 that is similar to the background setting 109 depicted as being displayed in FIGS. 1 and 2), the face of the man sitting at the computer may be one high importance portion of the background setting 509, the computer may be another high importance portion, and the man's torso may be a third high importance portion.

Besides using conventional feature recognition software or processes to determine high importance portions of the background setting, the processing unit 301 may additionally or alternatively determine high importance portions of the background setting by comparing properties associated with the background setting a photograph) to group membership information stored in the internal memory 303 or the external memory 319. For example, a user may store photographs of his or her family in family photo albums or directories in memory 303, 319. In such a case, the image display instructions 321 may limit high importance portions of the background setting to be faces and bodies of family members as determined by utilizing facial recognition software to compare faces in the photo used as the background setting to photos in family photo directories only. High importance portions of the background setting may be analogously limited to photos of team members (e.g., for a sports team), close friends, fraternity brothers or sorority sisters, and so forth.

Alternatively, instead of combining feature recognition with image property analysis, image property analysis may be the sole process used to determine the high importance portions of the background setting. For example, the device user may descriptively name each photo in a stored photo directory. The processing unit 301 may then utilize the naming convention to determine the high importance portion of the photo when the photo is used as the background setting. To illustrate, if the photo used as the background setting is named "Sister on Horseback at Center" and is stored in the "Family Vacation" photo directory, the processing unit 301 could determine from the photo properties alone (e.g., the name of the file) that the high importance portion of the photo is the center, which contains the sister (family group member). Thus, group membership as established by the electronic device user can be used solely or partially to deter line the high importance portion or portions of a display's background setting.

Still further, the high importance portions of the background setting may be defined or identified directly by the user. For example, the user may use conventional photo tags to identify high importance portions of a photo. The processing unit 301 may then be instructed by the image display instructions 321 to detect photo tags to deteiuiine the high importance portions of the photo when it is used as the background setting. Regardless of how the high importance portions of the background setting are determined, such a determination may be initially made prior to displaying the images 319 on the display screen 325 and may be updated over time, such as when the background setting includes a slideshow that causes the images in the background setting to change over time as described in more detail below with respect to FIGS. 6-8.

After the high importance portion or portions of the background have been determined, the processing unit 301 determines (405) whether the icons 521-532 are displayable without affecting the high importance portion or portions of the background setting (e.g., so that the high importance portion or portions of the background setting are viewable). For example, the processing unit 301, having been pre-programmed with the characteristics of the display 305 and the display screen 325, may initially analyze a default display arrangement for the icons 521-532, such as illustrated in FIG. 1, to determine whether any of the icons 521-532 would be positioned upon the background setting. If the default positions of the icons 521-532 would result in positioning of an icon upon one or more high importance portions of the background setting, the processing unit 301 determines whether the icons 521-532 can be repositioned or rearranged such that they can be displayed without affecting any high importance portion of the background setting (e.g., without any of the icons 521-532 being positioned upon, or otherwise affecting the viewability of, a high importance portion of the background setting). For example, referring to FIG. 5, if the three high importance portions of the background setting 509 are the man's face or head, the man's torso, and the computer, then the processing unit 301 may determine whether the icons 521-532 can be positioned such that none of them are positioned over, or otherwise affect the viewability of the man's face or head, the man's torso, and the computer.

When the icons 521-532 can be displayed such that all the high importance portions of the background setting are viewable, the processing unit 301 instructs the display 305 to display (407) the icons 521-532 and the background setting on the display screen 325 such that at least the high importance portions of the background setting are viewable. On the other hand, when the icons 521-532 cannot be displayed such that all the high importance portions of the background setting are viewable, the processing unit 301 prioritizes (409) the high importance portions of the background setting and displays (411) the icons 521-532 and the background setting such that at least the highest importance portion of the background setting is viewable. The prioritization of the high importance portions of the background setting may be defined by the user (e.g., using photo tags that are stored together with a photo in a photo directory) or may be automatically determined based on feature recognition as discussed above and various other criteria (e.g., faces are of higher importance than torsos, entire bodies, or objects; bodies or torsos are of higher importance than objects; faces of persons in photos in a stored photo directory or who are members of a particular group (e.g., family, team, etc.) are of highest importance; and so on). Thus, when prioritization is required, the processing unit 301 determines a highest priority or highest importance portion of the background setting and one or more lower priority portions of the background setting. The lower priority portions of the background setting are of lower importance than the highest importance portion, but may be of higher importance than a remainder of the background setting.

After completing prioritization of the high importance portions of the background setting, the processing unit 301 instructs the display 305 to display (411) the icons 521-532 and the background setting, on the display screen 325 such that at least the highest importance portion of the background setting is viewable. In other words, the image display instructions 321 strive to maintain uninterrupted display of at least the highest priority portion of the background setting in the event that all the high importance portions of the background setting cannot be displayed in full view when the icons 521-532 and the background setting are displayed together.

For example, referring again to FIG. 5 and as discussed above, assume that the high importance portions of the background setting 509 are the man's face, the man's torso, and the computer. In such a case, the processing unit 301 may first analyze a default positioning of the icons 521-532 (e.g., as illustrated in FIG. 1) with respect to the positioning of the high importance portions of the background setting 509 and determine that the icons 521-532 have to be repositioned in order to display the icons 521-532 and the background setting 509 together without affecting most, if not all, the high importance portions of the background setting 509. Having determined that repositioning of the icons 521-532 is necessary and having, pre-programmed knowledge of the display parameters, the processing unit 301 may further determine (405) that, as illustrated in FIG. 5, the icons 521-532 cannot be repositioned so as to allow all the high importance portions (e.g., man's face, man's torso, and computer) to be fully viewable. As a result, the processing unit 301 may then prioritize (409) the high importance portions of the background setting 509. For instance, with respect to the background setting 509 of FIG. 5, the processing unit 301 may use default prioritization criteria to prioritize the man's face as the highest importance portion, the computer as the second highest importance portion, and the man's torso as the least high importance portion of the background setting 509. The processing unit 301 then displays (411) the icons 521-532 such that at least the man's face is viewable. In the situation depicted in FIG. 5, the processing unit 301 is able position the icons 521-532 so as to display the man's face (highest importance portion) and the computer (second highest importance portion) without impact by the icons 521-532, but is unable to similarly display the man's torso (least higher importance portion). As shown in FIG. 5, icons 523 and 527 are partially positioned over respective portions of the man's torso.

After the background setting and the icons 521-532 have been displayed by the processing unit 301, the processing unit 301 determines (413) whether the background setting has changed or is to change. The background setting may change where, for example, the background setting includes a series of images implementing a slideshow or a video or where the user elects to replace the background setting with a new one. If the processing unit 301 determines that the background setting has changed or is to change, the processing unit 301 retrieves (401) the new image to be displayed as the background setting from the internal memory 303, the external memory 317, or a remote server (e.g., Internet server), as appropriate, and repeats the importance portion analysis and display process disclosed above with respect to blocks 403-411. Thus, where the background setting implements a slideshow, the high importance portions of the images may be determined on an image-by-image or slide-by-slide basis and the icons 521-532 are accordingly repositioned, as necessary, for each image or slide such that at least the highest importance portion of the current image is displayed together with the icons 521-532. Similarly, where the background setting implements a video, the high importance portions of the images may be determined on a video frame-by-video frame or frame group-by-frame group basis and the icons 521-532 are accordingly repositioned, as necessary, for each video image or group of video images such that at least the highest importance portion of the current image or group is displayed together with the icons 521-532.

Figure 7:
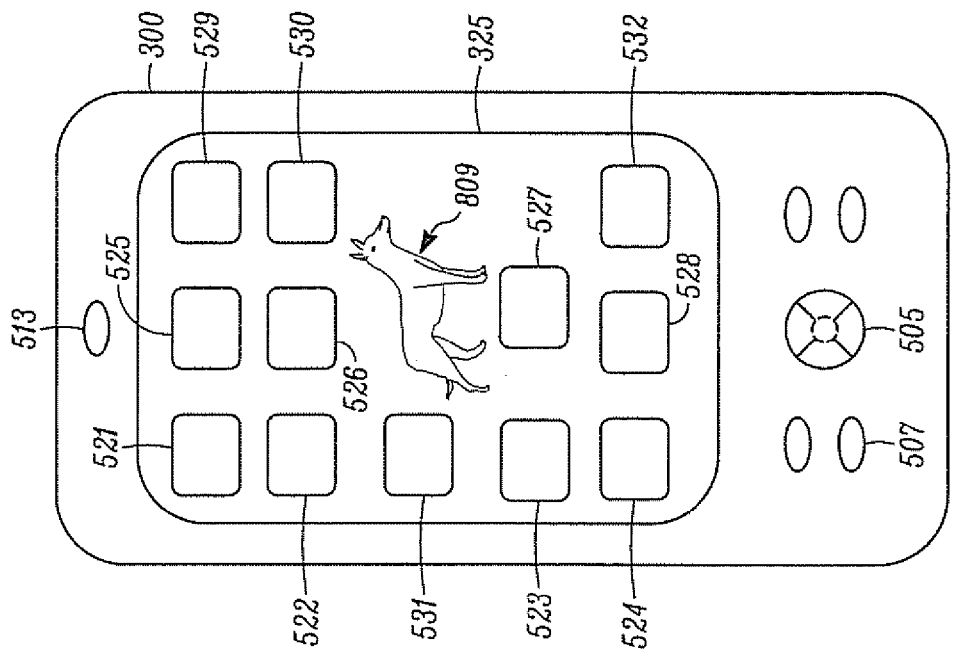
Figure 8:
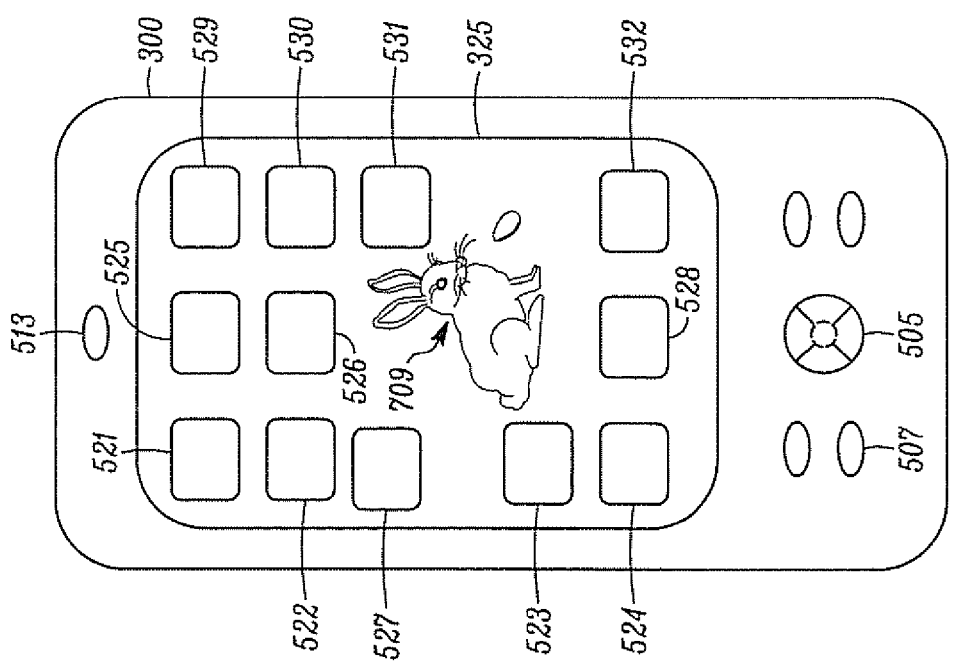

To illustrate the operation of the electronic device 300 when the background setting implements a slideshow, reference is made to FIGS. 6-8. For purposes of this illustration only, the background images 609, 709, 809 collectively form a three slide slideshow that starts with the background image 609 depicted in FIG. 6, changes to the background image 709 depicted in FIG. 7, and ends with the background image 809 depicted in FIG. 8. Once the slideshow ends, the processing unit 301 may automatically repeat it or await user input via the user interface 307. Those of ordinary skill in the art will readily recognize that the background slideshow may include more or fewer than three images at the discretion of the user.

When the first background image 609 of the slideshow is to be shown together with the icons 521-532, the processing unit 301 retrieves (401) the image 609 from memory 303, 317 and determines (403) the high importance portions of the image 609 as detailed above. With respect to the background image 609 of FIG. 6, the high importance portions may be the faces and bodies of the photographed women. The processing unit 301 then determines (405) whether the icons 521-532 can be displayed without affecting the high importance portions of the background image 609. If the icons 521-532 can be so displayed, the processing unit 301 positions and displays (407) the icons 521-532 on the display screen 325 such that at least the faces and bodies of the women are viewable. As illustrated in FIG. 6, the processing unit 301 is able in this example to position the icons 521-532 on the display screen 325 such that the entire background image 609 is viewable when displayed together with the icons 521-532. If all the high importance portions of the background image 609 had not been viewable due to the quantity and/or sizes of the icons 521-532 to be displayed, the processing unit 301 would have prioritized (409) the high importance portions of the image 609 and displayed (411) the icons 521-532 and the background image 609 such that at least the highest importance portion of the background image 609 (e.g., the women's faces) was viewable.

When time for displaying the first slide image 609 has expired according to a slideshow timer executing in the processing unit 301, the processing unit 301 retrieves (401) the next background image 709 in the slideshow from memory 303, 317 and determines (403) the high importance portions of the new image 709 in the exemplary manner detailed above. With respect to the background image 709 of FIG. 7, the high importance portions may be the head of the bunny and the egg. The processing unit 301 then determines (405) whether the icons 521-532 can be displayed without affecting the high importance portions of the new background image 709. If the icons 521-532 can be so displayed, the processing unit 301 positions and displays (407) the icons 521-532 on the display screen 325 such that at least the bunny's head and the egg are viewable. As illustrated in FIG. 7, the processing unit 301 is again able in this example to position the icons 521-532 on the display screen 325 such that the entire background image 709 is viewable when displayed together with the icons 521-532. As evident from a comparison of FIGS. 6 and 7, the processing unit 301 repositioned icons 525-527 and 531 to take into account the change in background image resulting from the slideshow. If all the high importance portions of the background image 709 had not been viewable due to the quantity and/or sizes of the icons 521-532 to be displayed, the processing unit 301 would have prioritized (409) the high importance portions of the image 709 and displayed (411) the icons 521-532 and the background image 709 such that at least the highest importance portion of the background image 709 (e.g., the bunny's head) was viewable.

When time for displaying, the second slide image 709 has expired according to the slideshow timer, the processing unit 301 retrieves (401) the final background image 809 in the exemplary slideshow from memory 303, 317 and determines (403) the high importance portions of the new image 809 in the exemplary manner detailed above. With respect to the background image 809 of FIG. 8, the high importance portions may be the head and body of the dog. The processing unit 301 then determines (405) whether the icons 521-532 can be displayed without affecting the high importance portions of the new background image 809. If the icons 521-532 can be so displayed, the processing unit 301 positions and displays (407) the icons 521-532 on the display screen 325 such that at least the dog's head and body are viewable. As illustrated in FIG. 8, the processing unit 301 is once again able in this example to position the icons 521-532 on the display screen 325 such that the entire background image 809 is viewable when displayed together with the icons 521-532. As evident from a comparison of FIGS. 7 and 8, the processing unit 301 repositioned icons 527 and 531 to take into account the change in background image resulting from the slideshow. If all the high importance portions of the background image 809 had not been viewable due to the quantity and/or sizes of the icons 521-532 to be displayed, the processing unit 301 would have prioritized (409) the high importance portions of the image 809 and displayed (411) the icons 521-532 and the background image 809 such that at least the highest importance portion of the background image 809 (e.g., the dog's head) was viewable.

While the slideshow is ongoing, the processing unit 301 may further determine (415) whether a user is approaching the user interface 307. Such a determination may be made by analyzing an output of the user sensor 313. For example, when the user sensor 313 is a camera 513 integrated into the electronic device 300, the processing unit 301 may process video signals received from the camera 513 and determine whether a user's hand may be moving, toward the user interface 307. Alternatively, when the user sensor 313 is an IR sensor positioned proximate the user interface 307, the processing, unit 301 may monitor an output of the IR sensor to determine that an object has interrupted the IR signal and is, therefore, approaching the user interface 307. Still further, when the user interface 307 is a capacitive touchscreen display, the user sensor 313 may be integrated into the touchscreen display to detect an increase in capacitance that is less than normally detected when the screen has been touched, but greater than the capacitance normally detected when a person's hand is more than a predetermined distance away from the touchscreen. Those of ordinary skill in the art will readily recognize that various other methods may be used to detect that the user is approaching the user interface 307 prior to the user's actual use of the user interface 307.

When the processing unit 301 does not determine that the user is approaching the user interface 307, the processing unit 301 maintains the status quo with respect to the display of the background setting and the icons 521-532 (e.g., continues displaying the slideshow background setting together with the icons 521-532 and appropriately repositioning the icons 521-532 as necessary to maintain viewability of the high importance portions of the background images 609, 709, 809), and may further perform other tasks, such as executing, (421) various applications 323. However, when the processing unit 301 determines that the user is approaching the user interface 307, the processing unit 301 may freeze (417) the icon locations on the display screen 325 and display the icons 521-532 at the frozen locations irrespective of the positions of the icons 521-532 relative to the high importance portions of the background setting. The icon positions may be frozen to enable the user to easily select a desired icon when using the user interface 307. While the icon positions may be frozen, the processing unit 301 may allow the slideshow to continue. As a result, the background setting may continue to change while the icon positions are frozen, potentially causing high importance portions of the current background image to be temporarily non-viewable. For example, if the icons 521-532 are frozen at the positions in FIG. 8 and the background image transitions from image 809 in FIG. 8 to image 609 in FIG. 6, icon 526 would likely be located directly upon the faces of the women in image 609, which may be the highest importance portions of image 609.

After freezing the locations of the icons 521-532, the processing unit 301 monitors user interface activity to determine (419) whether the user has ceased entering inputs via the user interface 307. If user interface activity has ceased, the processing unit 301 restarts or resumes the image display control process, determines (405) whether the icons 521-532 are displayable without affecting the high importance portion or potions of the current background image 609, 709, 809, and continues instructing the display 305 to reposition the icons 521-532 as necessary on the display screen 325 to display the icons 521-532 together with the current background image 609, 709, 809 such that at least one or more of the high importance portions of the background image 609, 709, 809 are viewable.

In addition to displaying icons 521-532 and a background setting, the processing unit 301 may also execute (421) one or more of the applications 323 stored in memory 303, 317. Upon commencing execution of an application that requires a window to be displayed on the display screen 325, the processing unit 301 determines (423) whether the application window or windows opened pursuant to execution of the application are displayable on the display screen 325 without affecting the high importance portion or portions of the background setting (e.g., so that the high importance portion or portions of the background setting are viewable). The determination of the high importance portion(s) of the background setting was made in block 403 and is described above. For example, the processing unit 301, having been pre-programmed with the characteristics of the display 305 and the display screen 325, may initially analyze a default display arrangement for the application window, such as illustrated in FIG. 2, to determine whether the window would be positioned over the background setting. If the default position of the window would result in positioning of the window upon one or more high importance portions of the background setting, the processing unit 301 determines whether the window can be repositioned or re-sized such that it can be displayed without affecting any high importance portion of the background setting (e.g., without any part of the window being positioned upon, or otherwise affecting the viewability of a high importance portion of the background setting). For example, referring to FIG. 9, if the high importance portions of the background setting 809 are the head and body of a photographed dog, then the processing unit 301 determines whether the application window 901 can be positioned or sized such that the window 901 is not positioned over, or does not otherwise affect the viewability of, the dog's head and body.

When the application window or windows can be displayed such that all the high importance portions of the background setting are viewable, the processing unit 301 instructs the display 305 to display (425) the background setting and the application window or windows together on the display screen 325 such that at least the high importance portions of the background setting are viewable. On the other hand, when the application window or windows cannot be displayed such that all the high importance portions of the background setting are viewable, the processing unit 301 prioritizes (427) the high importance portions of the background setting as discussed above with respect to block 409 and determines (429) whether the application window(s) is displayable without affecting at least the highest importance portion of the background setting. If the application window or windows may be so displayed, the processing unit 301 instructs the display 305 to display (431) the application window or windows such that at least the highest importance portion of the background setting is viewable. By contrast, if the application window or windows may not be so displayed (e.g., due to the placement or size of the window(s) as commanded by the application), the processing unit 301 instructs the display 305 to reposition (433) the background setting such that, when the application window is displayed, at least the highest importance portion of the background setting is viewable. Thus, in this latter case, the processing unit 301 instructs the display 305 to display (431) the application window or windows on the display screen 325 and further instructs the display 305 to reposition (433) the background setting on the display screen 325 to facilitate viewing of at least the highest importance portion (and preferably all of the high importance portions) of the background setting during display of the application window or windows.

Figure 10:
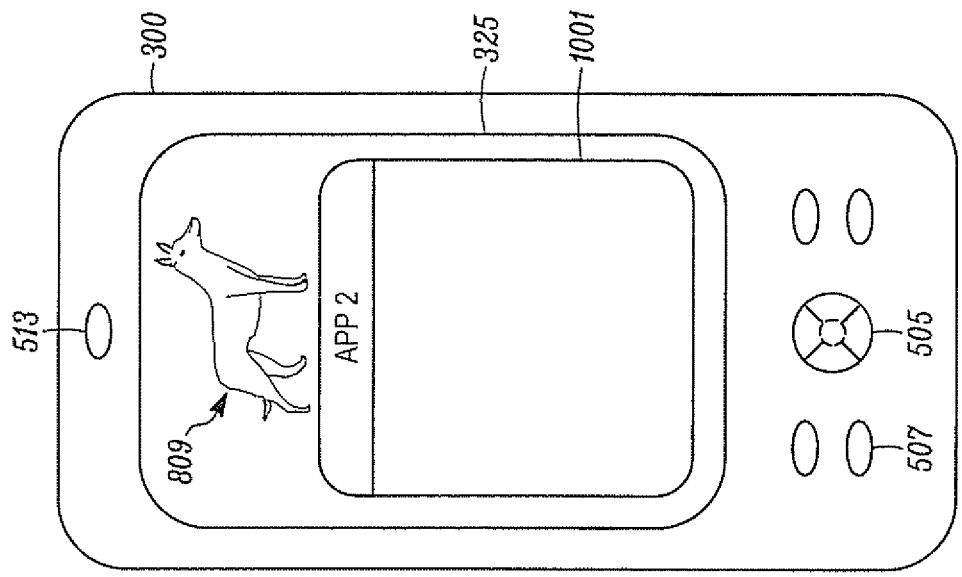
FIG. 10 illustrates automated repositioning of a background setting on the display screen of a handheld device embodiment of the electronic device of FIG. 3 so as to accommodate display of an application window while maintaining viewability of high importance portions of the background setting, in accordance with a further exemplary embodiment of the present invention.
Figure 9:
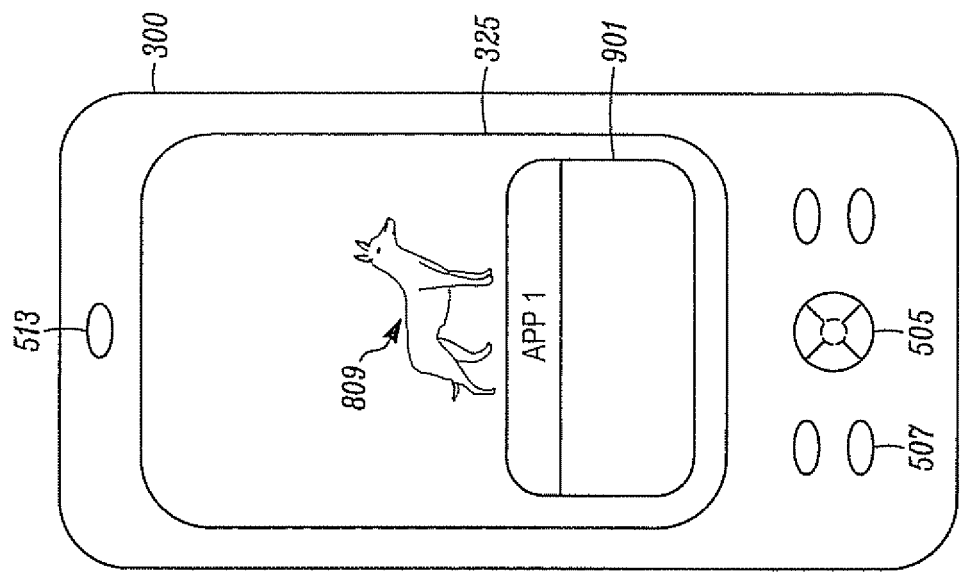
FIG. 9 illustrates automated positioning of an application window on the display screen of a handheld device embodiment of the electronic device of FIG. 3 such that high importance portions of a background setting are viewable, in accordance with a further exemplary embodiment of the present invention.

Examples of positioning or repositioning of an application window and/or a background setting to maintain viewability of at least the high importance portions of the background setting are provided with respect to FIGS. 9 and 10. As illustrated in FIG. 9, when the processing unit 301 executes a first application (e.g., APP 1), the processing unit 301 may instruct the display 305 to display the application window 901 resulting from execution of the application such that the window 901 is below the background setting 809 on the display screen 325. Such a display instruction may result from the processing unit's contemporaneous execution of the image display instructions 321 in the context of the executing application. For example, if the executing application does not impose window size or screen location restrictions, then the image display instructions 321 may cause the processing unit 301 to instruct the display 305 to position and size the window 901 such that the window 901 resides below the background setting 809 or otherwise allows at least the high importance portions of the background setting 809 to be viewable when the background setting 809 is in its normal or default position on the display screen 325.

Alternatively, where an application (e.g., APP2) does not permit re-sizing or repositioning of the window 1001 or requires a larger window 1001 for display purposes, the image display instructions 321 may cause the processing unit 301 to instruct the display 305 to reposition the background setting 809 such that at least the high importance portions of the background setting 809 are viewable when the window 1001 and the background setting 809 are displayed together. For example, as illustrated in FIG. 10, the processing unit 301 may instruct the display 305 to reposition the background setting 809 above the application window 1001 on the display screen 325. Thus, in this latter case, the processing unit 301 may move or reposition the background setting 809 instead of the application window 1001. Such repositioning of the background setting may also be utilized to keep high importance portions of the background setting viewable when the background setting is displayed together with icons or other graphic or textual content. That is, as an alternative to solely repositioning icons, the processing unit 301 may reposition both the background setting and the icons or just the background setting in order to maintain viewability of high importance portions (or at least the highest importance portion) of the background setting. In the example depicted in FIGS. 9 and 10, the illustrated background setting 809 is identical to the last background image 809 from the slideshow discussed above with respect to FIGS. 6-8. However, those of ordinary skill in the art will readily recognize that the background setting may alternatively be any other image or collection of images (e.g., a collection of images forming a video), as may be desired by the user.

The present invention encompasses an electronic device and a method for displaying a background setting together with one or more icons and/or application windows on a display screen thereof. With this invention, high importance portions of a background setting, such as electronic wallpaper, may remain viewable when the background setting is displayed together with icons or application windows on a display screen of the electronic device. According to embodiments of the present invention, one or more of the background setting, the icons, and the application windows are positioned or repositioned to allow the high importance portions of the background setting to remain viewable on the display screen. When the quantities and/or sizes of the icons, the application windows, and the background setting are such that, even with repositioning, all the high importance portions of the background setting cannot remain viewable, the electronic device prioritizes the high importance portions of the background setting and positions the displayed elements such that at least the highest importance portion of the background setting remains viewable. By keeping the high importance portions of the background setting in view, the present invention allows the electronic device user to enjoy the background setting, which was likely created or selected by the user, during various uses of the electronic device.

As detailed above, embodiments of the present invention reside primarily in combinations of method steps and/or apparatus components related to displaying a background setting together with icons and/or application windows on a display screen of an electronic device. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual such relationship or order between such entities or actions. The terms "comprises," "comprising," "includes," "including," "has," "having," "contains," "containing," and any other variations thereof are intended to cover a non-exclusive inclusion, such that a process, method, article, or apparatus that comprises, includes, has, or contains a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the electronic device 300 described herein may be comprised of one or more conventional processors and unique stored program instructions that control the processor(s) to implement, in conjunction with certain non-processor circuits, some, most, or all of the functions of the electronic device 300 and its operational methods as described herein. The non-processor circuits may include, but are not limited to, storage devices, such as the internal memory 303 and/or the external memory 317, the display 305 and the user interface 307 described above, as well as filters, display drivers, clock circuits, power source circuits, and various other non-processor circuits. As such, the functions of these non-processor circuits may be interpreted as steps of a method to display images on a display screen of an electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. An electronic device comprising:
 a display that includes a display screen on which images are electronically displayable, the images including at least one icon and at least one image to be used as a background setting for the display screen;
 at least one storage device operable to digitally store the images and operating instructions for displaying the images; and
 a processing unit operably coupled to the display and the at least one storage device, the processing unit being operable in accordance with the operating instructions to:
  retrieve the images from the at least one storage device;
  determine at least one portion of the background setting that is of higher importance than a remainder of the background setting to produce at least one high importance portion of the background setting; and
  instruct the display to display the background setting and the at least one icon on the display screen such that the at least one high importance portion of the background setting is viewable.

2. The electronic device of claim 1, wherein the at least one icon includes a plurality of icons and wherein the processing unit is further operable in accordance with the operating instructions to instruct the display to display the background setting and the plurality of icons on the display screen such that the at least one high importance portion of the background setting is viewable.

3. The electronic device of claim 1, wherein the processing unit is further operable in accordance with the operating instructions to:
 determine multiple portions of the background setting that are of higher importance than a remainder of the background setting to produce multiple high importance portions of the background setting; and
 instruct the display to display the background setting and the at least one icon on the display screen such that the multiple high importance portions of the background setting are viewable.

4. The electronic device of claim 1, wherein the at least one icon includes a plurality of icons and wherein the processing unit is further operable in accordance with the operating instructions to:
 determine a first portion of the background setting that is of highest importance;
 determine at least a second portion of the background setting that is of lower importance than the first portion of the background setting, but is of higher importance than a remainder of the background setting;
 determine whether the plurality of icons and the background setting can be displayed on the display screen such that the first portion of the background setting and the at least a second portion of the background setting are viewable; and
 responsive to determining that the plurality of icons and the background setting cannot be displayed on the display screen such that the first portion of the background setting and the at least a second portion of the background setting are viewable, instruct the display to display the plurality of icons and the background setting on the display screen such that at least the first portion of the background setting is viewable.

5. The electronic device of claim 4, wherein the background setting includes a photograph of a person, wherein the first portion of the background setting is a face of the person in the photograph, and wherein the second portion of the background setting is a torso of the person in the photograph.

6. The electronic device of claim 1, wherein the background setting includes a photograph of a person and wherein the processing unit is operable in accordance with the operating instructions to determine the at least one high importance portion of the background setting by comparing the photograph to at least one photograph stored in a photo directory of the at least one storage device.

7. The electronic device of claim 1, wherein the background setting includes a photograph of a person and wherein the processing unit is operable in accordance with the operating instructions to determine the at least one high importance portion of the background setting by comparing properties associated with the photograph to group membership information stored in the at least one storage device.

8. The electronic device of claim 1, wherein the background setting includes a plurality of images implementing a slideshow and wherein the processing unit is operable in accordance with the operating instructions to:
 determine at least one high importance portion for each of the plurality of images of the slideshow; and
 instruct the display to display, on an image-by-image basis, a particular image of the slideshow and the at least one icon on the display screen such that the at least one high importance portion of the particular image is viewable.

9. The electronic device of claim 8, further comprising:
 a user interface coupled to the processing unit, the user interface operable to accept inputs from a user of the electronic device; and
 a user sensor, coupled to the processing unit, for detecting whether the user is approaching the user interface;
 wherein the processing unit is further operable in accordance with the operating instructions to:
  instruct the display to display the plurality of images of the slideshow and the at least one icon on the display screen irrespective of whether high importance portions of the plurality of images of the slideshow are viewable when the user sensor detects that the user is approaching the user interface.

10. The electronic device of claim 9, wherein the processing unit is further operable in accordance with the operating instructions to:
   determine whether the user has ceased entering inputs via the user interface; and
   instruct the display to resume displaying the plurality of images of the slideshow and the at least one icon on the display screen such that the high importance portions of the plurality of images of the slideshow are viewable when the user has ceased entering inputs via the user interface.

11. The electronic device of claim 9, wherein the user interface includes a touchscreen incorporated into the display screen and the user sensor includes at least one of an infrared sensor and a camera.

12. The electronic device of claim 1, wherein the background setting includes a plurality of images implementing a video, the electronic device further comprising:
   a user interface coupled to the processing unit, the user interface operable to accept inputs from a user of the electronic device; and
   a user sensor, coupled to the processing unit, for detecting whether the user is approaching the user interface;
   wherein the processing unit is further operable in accordance with the operating instructions to:
      determine high importance portions for the plurality of images of the video;
      instruct the display to display the plurality of images of the video and the at least one icon on the display screen such that the high importance portions of the plurality of images of the video are viewable when the user sensor does not detect that the user is approaching the user interface;
      instruct the display to display the plurality of images of the video and the at least one icon on the display screen irrespective of whether the high importance portions of the plurality of images of the video are viewable when the user sensor detects that the user is approaching the user interface;
      determine whether the user has ceased entering inputs via the user interface; and
      instruct the display to resume displaying the plurality of images of the video and the at least one icon on the display screen such that the high importance portions of the plurality of images of the video are viewable when the user has ceased entering inputs via the user interface.

13. The electronic device of claim 1, wherein the at least one storage device further stores applications executable by the processing unit and wherein the processing unit is further operable in accordance with the operating instructions to:
   instruct the display to display, on the display screen, windows opened pursuant to execution of one or more of the applications such that the at least one high importance portion of the background setting is viewable.

14. The electronic device of claim 1, wherein the at least one storage device further stores applications executable by the processing unit and wherein the processing unit is further operable in accordance with the operating instructions to:
   instruct the display to display, on the display screen, at least one window opened pursuant to execution of one or more of the applications; and
   further instruct the display to reposition the background setting on the display screen such that the at least one high importance portion of the background setting is viewable during display of the at least one window.

15. The electronic device of claim 1, wherein the at least one storage device comprises at least one of an internal memory of the electronic device and a transportable external memory connectable to the electronic device.

16. A method for an electronic device to display images on a display screen of the electronic device, the images being stored in at least one storage device and including at least one icon and at least one image to be used as a background setting for the display screen, the method comprising:
   retrieving the images from the at least one storage device;
   determining at least one portion of the background setting that is of higher importance than a remainder of the background setting to produce at least one high importance portion of the background setting; and
   displaying the background setting and the at least one icon on the display screen such that the at least one high importance portion of the background setting is viewable.

17. The method of claim 16, wherein the at least one icon includes a plurality of icons, the method further comprising:
   determining a first portion of the background setting that is of highest importance;
   determining at least a second portion of the background setting that is of lower importance than the first portion of the background setting, but is of higher importance than a remainder of the background setting;
   determining whether the plurality of icons and the background setting can be displayed on the display screen such that the first portion of the background setting and the at least a second portion of the background setting are viewable; and
   responsive to determining that the plurality of icons and the background setting cannot be displayed on the display screen such that the first portion of the background setting and the at least a second portion of the background setting are viewable, displaying the plurality of icons and the background setting on the display screen such that at least the first portion of the background setting is viewable.

18. The method of claim 16, wherein the at least one image used for the background setting includes a photograph of a person and wherein the step of determining at least one high importance portion of the background setting comprises at least one of:
   comparing the photograph to at least one photograph stored in a photo directory of the at least one storage device; and
   comparing properties associated with the photograph to group membership information stored in the at least one storage device.

19. The method of claim 16, wherein the at least one image to be used for the background setting includes a plurality of images implementing one of a slideshow and a video and wherein the electronic device further includes a user interface and a user sensor for detecting whether the user is approaching the user interface, the method further comprising:
   displaying the plurality of images and the at least one icon on the display screen irrespective of whether high importance portions of the plurality of images are viewable when the user sensor detects that the user is approaching the user interface;
   determining whether the user has ceased entering inputs via the user interface; and
   resuming display of the plurality of images and the at least one icon on the display screen such that the high importance portions of the plurality of images are viewable when the user has ceased entering inputs via the user interface.

20. The method of claim 16, wherein the at least one storage device further stores applications executable by the electronic device, the method further comprising:
displaying, on the display screen, at least one window opened pursuant to execution of one or more of the applications; and
repositioning the background setting on the display screen such that the at least one high importance portion of the background setting is viewable during display of the at least one window.

* * * * *